Figure 1:
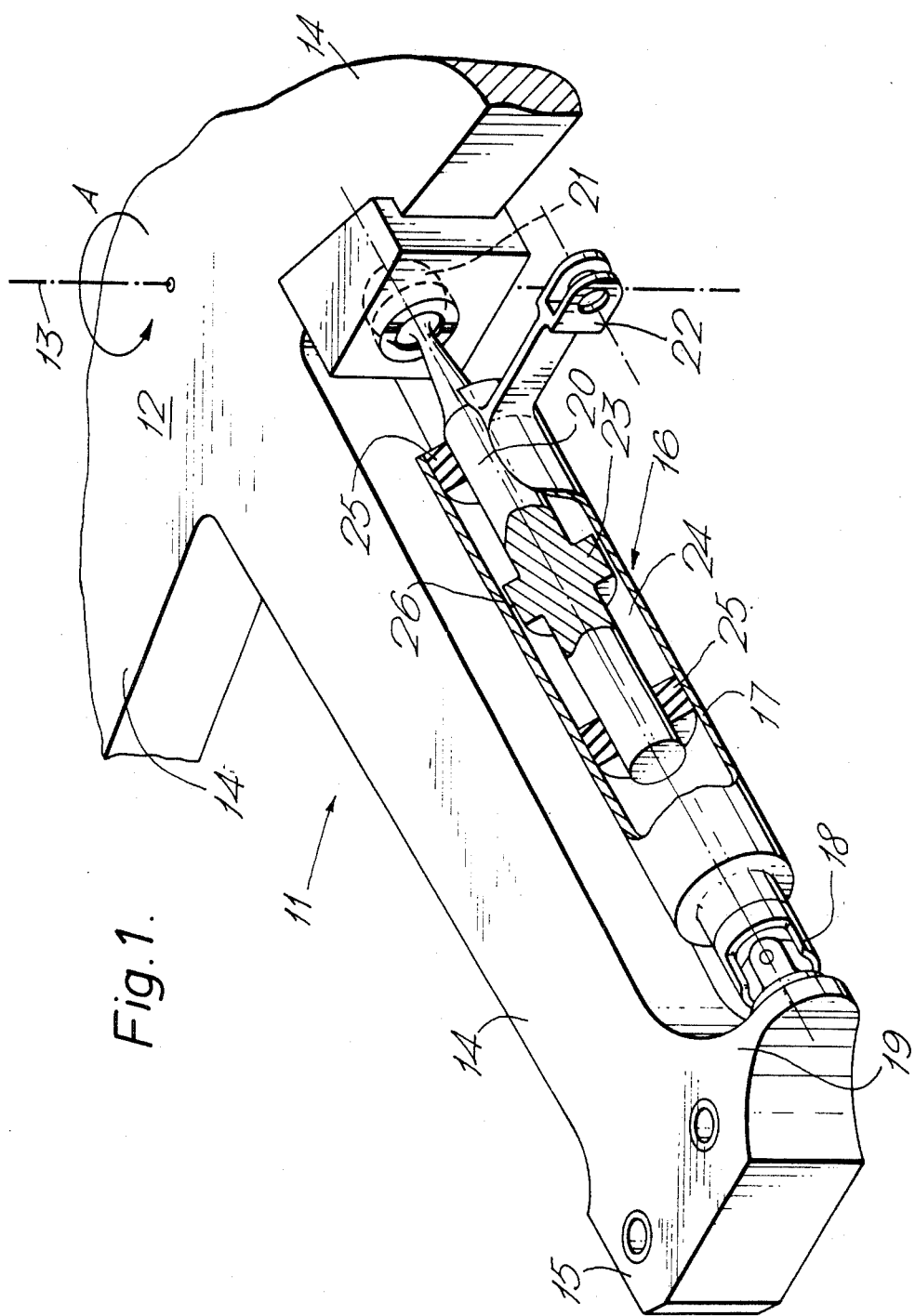

United States Patent [19]

Vincent

[11] Patent Number: 4,549,850
[45] Date of Patent: Oct. 29, 1985

[54] HELICOPTER ROTORS

[75] Inventor: Alan H. Vincent, Somerset, England

[73] Assignee: Westland plc, Somerst, England

[21] Appl. No.: 633,420

[22] Filed: Jul. 23, 1984

[30] Foreign Application Priority Data

Aug. 22, 1983 [GB] United Kingdom ............... 8322518

[51] Int. Cl.[4] ...................... B64C 27/38; B64C 27/72
[52] U.S. Cl. ............................ 416/140; 416/134 A; 416/141; 416/107
[58] Field of Search ............... 416/106, 107, 158, 114, 416/134 A, 138 A, 138 R, 141, 140 A, 140 R

[56] References Cited

U.S. PATENT DOCUMENTS

| 2,203,012 | 6/1940 | Campbell | 416/140 A X |
|---|---|---|---|
| 2,696,271 | 12/1954 | Jovanovich | 416/106 |
| 2,818,124 | 12/1957 | Johnston | 416/141 X |
| 3,144,082 | 8/1964 | Grant et al. | 416/106 |
| 3,282,350 | 11/1966 | Kisovec | 416/134 A |
| 4,028,000 | 6/1977 | Weiland et al. | 416/107 |
| 4,266,912 | 5/1981 | Roman | 416/141 |
| 4,345,876 | 8/1982 | Schwarz et al. | 416/141 X |
| 4,349,317 | 9/1982 | Desjarding | 416/141 X |
| 4,352,631 | 10/1952 | Buchs et al. | 416/141 X |
| 4,452,569 | 6/1984 | Stephan et al. | 416/134 A |

FOREIGN PATENT DOCUMENTS 673113   6/1952   United Kingdom ............... 416/106

Primary Examiner—Everette A. Powell, Jr.
Attorney, Agent, or Firm—Larson and Taylor

[57] ABSTRACT

A bearingless helicopter rotor includes an integral damper and pitch change assembly (16) adapted to damp lead/lag movements of a rotor blade and to change the pitch of the rotor blade. In described embodiments, the assembly includes a generally tubular body portion (17, 27) closed at one end and attached by torque transmitting means (18, 28) to a flexure member blade attachment and a rod (20, 29) protruding axially from the other end of the body portion and attached adjacent the rotor hub. Pitch change movements are effected by rotation of the body portion about its longitudinal axis and damping of lead/lag movements either by metering of an incompressible medium across a piston (23) in a chamber (24) formed internally of the body portion or by an annular body of elastomer material (34) bonded to the outside diameter of the rod and the inside diameter of the body portion.

6 Claims, 3 Drawing Figures

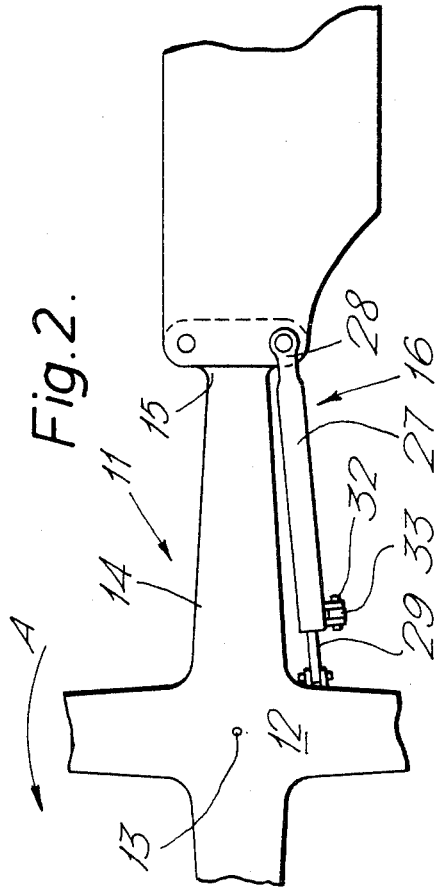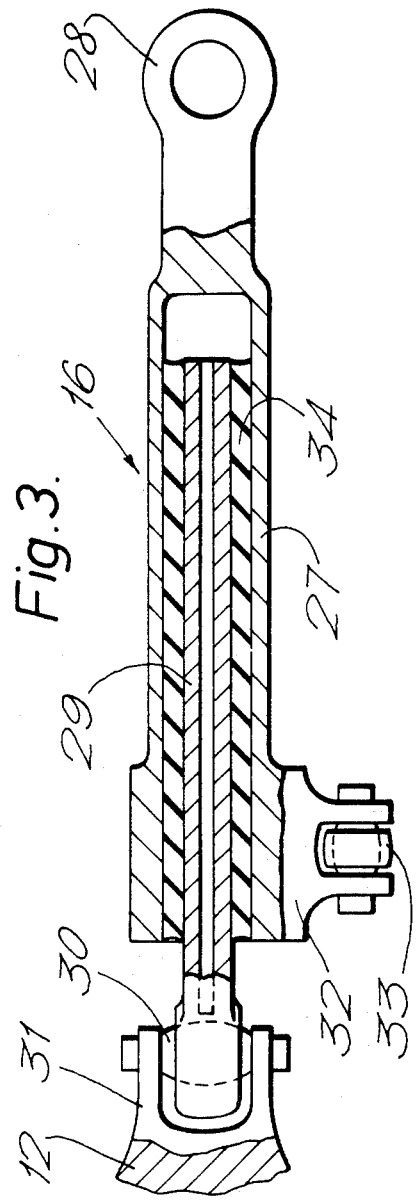

HELICOPTER ROTORS

This invention relates to helicopter rotors and particularly to bearingless helicopter rotors.

By a bearingless helicopter rotor we mean a rotor in which blade flap, lead/lag and pitch movements are accommodated by a flexure member, of metal or composite material, extending radially between a rotor hub and a rotor blade attachment.

All rotors require some means of applying collective pitch or both collective and cyclic pitch change movements to the blades, and this requirement has been complicated with the advent of bearingless rotors because of the radial distance between the axis of rotation of the rotor and the rotor blade attachment at the end of the flexure member at which blade pitch change inputs have to be applied.

Furthermore, helicopters are subject to a phenomenon known as ground resonance which manifests itself as a mechanical instability caused when the speed of rotation of the rotor passes through a value corresponding to the frequency of the first natural lead/lag vibration mode of the rotor blade.

This problem can be overcome by applying constraint in the design, for example, of the helicopter undercarriage, and in the operation of the helicopter, such as by restricting the use of certain operating surfaces, rotor speeds and loading conditions. Such constraints are of course undesirable and a preferred solution to the problem is the use of damping blade movement in the lead/lag mode which, conventionally, espcially in articulated rotors, has been accomplished by installing an hydraulic damper across the lead/lag hinge and located in the plane of rotation.

Whilst the use of modern materials, e.g. fibre-reinforced plastics materials, in the manufacture of the flexure members of bearingless rotors has enabled the resilient properties of such members to be determined during design, nevertheless, due to the essentially different stiffness requirements in the flap and lead/lag planes, it is likely that some form of additional damping will be required in the lead/lag plane.

A prior example of a bearingless rotor is disclosed in UK Patent Specification No. GB-A-2001026. In that disclosure, blade pitch changes are transmitted through a rigid torque tube completely encompassing the flexure member, an outer end of the torque tube being rigidly attached to the blade attachment and an inner end supported pivotally by an elastomeric bearing and connected to a conventional pitch control arm. The elastomeric bearing is mounted on elastomer plates operating in shear in respect of blade lead/lag (drag) movements to provide damping in the lead/lag plane.

The size of the torque tube is dictated by a number of factors; it has to encompass the flexure member; it has to permit unrestrained flap and lead/lag movements of the flexure member; it has to be sufficiently rigid to transmit operational flap and lead/lag movements of the rotor blade; and it has to house at its inner end a large diameter elastomeric bearing sized to cater for operational deflections. These factors combined, result in a very large diameter torque tube, especially at its inner end, which increases its weight and creates a high aerodynamic drag.

According to the present invention a bearingless helicopter rotor including, for each of a plurality of rotor blades, a flexure member extending radially between a rotor hub and a blade attachment, said flexure members being flexible in torsion to permit blade pitch changes and in the flap and lead/lag planes to permit operational deflections is characterised by an integral damper and pitch change assembly located externally of each flexure member in the plane of rotation of the rotor and generally parallel to its associated flexure member so as to damp lead/lag movements of the rotor blade and to change the pitch of the rotor blade.

The integral damper and pitch change assembly may comprise a generally tubular body portion closed at one end and attached by transmitting means to the flexure member blade attachment, a rod protruding axially from the other end of the body portion and attached adjacent the rotor hub, a pitch change arm rotationally fixed to the body and adapted for attachment to pitch change means to rotate the body about its longitudinal axis to change the pitch of the rotor blade, and damping means adapted to damp relative axial movements.

The torque transmitting means may comprise a torque transmitting universal joint and the rod may be attached to the rotor hub by a spherical joint.

In one embodiment, the damping means may comprise a piston carried by the rod and located in a chamber formed internally of the body portion and defined by axially spaced-apart bearing and seal assemblies, incompressible damping medium filling the chamber and a metering orifice interconnecting the portions of the chamber on either side of the piston.

The metering orifice may comprise an annular gap between an external diameter of the piston and an internal diameter of the body portion.

In a preferred embodiment, the damping means may comprise an annular body of elastomer material bonded to the outside diameter of the rod and to the inside diameter of the body portion. In one form of such an embodiment the rod may be attached to the rotor hub through a spherical joint to permit said rotation of the body portion about its longitudinal axis and in another form rotation of the body portion may be permitted by torsional deflection of said annular body of elastomer.

The invention will now be described by way of example only and with reference to the accompanying drawings in which:

FIG. 1 is a fragmentary, part-sectioned, perspective illustration of a helicopter rotor constructed in accordance with one embodiment of the invention, FIG. 2 is a plan view of a helicopter rotor according to a further embodiment of the invention; and FIG. 3 is a fragmentary, part-sectioned, plan view of part of the rotor of FIG. 2.

In both of the embodiments, illustrated respectively in FIG. 1 and in FIGS. 2 and 3, a helicopter rotor, generally indicated at 11, includes a rotor hub 12 adapted for rotation about an axis 13 in the direction of arrow A and a plurality of radially extending flexure members 14 each terminating at an outer end 15 adapted for attachment of a rotor blade. The hub 12 and flexure members 14 comprise an integral assembly constructed, preferably, of fibre-reinforced plastics materials, each of the flexure members being flexible in torsion to permit pitch change movements and in blade flap and lead/lag planes to permit operational deflections.

An integral lead/lag damper and pitch change assembly 16 is operatively associated with each flexure member 14, and is located externally of the flexure member 14 in the plane of rotation and generally parallel to the flexure member 14.

Referring now to the embodiment of FIG. 1, the assembly 16 includes a hollow generally tubular body portion 17 closed at one end and attached through a torque transmitting universal joint 18 to a flange portion 19 formed integrally at the blade attachment end 15 of the flexure member 14. A rod 20 protrudes axially from the open end of body portion 17 and is attached by a spherical joint 21 to the surface of the inner end of an adjacent flexure member 14. A pitch change arm 22 protrudes laterally from an inner end of the body portion 17 and is adapted for attachment to a blade pitch change track rod (not shown).

A piston head 23 is located intermediate the ends of rod 20 and divides into two parts, a chamber 24 in the body portion 17 that is defined by axially spaced-apart bearing and seal assemblies 25. The chamber 24 is filled with an incompressible damping medium, and an annular gap 26 between an external diameter of the piston head 23 and an internal diameter of the body portion 17 forms a metering orifice between the two parts of chamber 24.

In the embodiment of FIGS. 2 and 3, the assembly 16 comprises a hollow generally tubular body portion 27 closed at one end and attached through an apertured flanged end portion 28 in a torque transmitting manner to the blade attachment end 15 of the flexure member 14. A tubular rod 29 protrudes axially from the open end of body portion 27 and is attached through a spherical joint 30 to integral flanges 31 formed adjacent the rotor hub 12. A pitch change arm 32 protrudes laterally from an inner end of the body portion 27 and is adapted for attachment to the upper end of a blade pitch change track rod 33.

An annular body of elastomer material 34 is located in the annulus between an external diameter of the rod 29 and an internal diameter of the body portion 27, and is bonded to the surfaces throughout its length.

In operation of a rotor constructed according to this invention, rotation of the rotor hub 12 is transmitted by the flexure members 14 to rotate the rotor blades about the axis 13 in a plane of rotation substantially perpendicular to the axis 13. Resilient flexing of the flexure members 14 permits operational movements of the rotor blades in a plane perpendicular to the plane of rotation, i.e. the blade flap plane, and in a plane co-incident with the plane of rotation, i.e. the blade lead/lag plane.

Pitch changes of the rotor blades as well as damping of blade lead/lag movements are accommodated by the integral lead/lag damper and pitch change assembly 16. Thus, in the embodiment of FIG. 1, blade pitch movements initiated by general vertical movement of a track rod attached to pitch change arm 22 cause rotation of the tubular body portion 17 about its longitudinal axis and are transmitted by universal joint 18 and integral boss 19 to change the pitch of a rotor blade attached to the outer end 15 of flexure member 14. Rotor blade lead/lag movements cause in-plane flexing of the flexure member 14 resulting in relative axial movements between the body portion 17 and the rod 20 which forces the damping medium through the annular gap 26 between the two parts of chamber 24 to provide damping of rotor blade lead/lag movements. It will be noted that the torque transmitting universal joint 18 and the inner spherical bearing 21 ensure that the integral lead/lag damper and pitch change assembly 16 does not restrain flexible bending of the flexible member 14 in the blade flap plane.

In the embodiment of FIGS. 2 and 3, rotor blade pitch changes are transmitted from the track rod 33 and through the pitch change arm 32 to rotate the body portion 27 about its longitudinal axis to change the pitch of an attached rotor blade. In this embodiment the rotation of body portion 27 is permitted by the spherical joint 30. Damping in the lead/lag plane is provided by the hysteresis of the elastomer material 34 which operates in shear due to relative axial movements of the body portion 27 and the rod 29 caused by blade lead/lag movements.

Thus the bearingless rotor of this invention incorporates, for each blade, a single assembly providing both for blade pitch change movements and for lead/lag damping, thereby minimising the number of component parts of the rotor, and its weight and cost. Furthermore, each integral lead/lag damper and pitch change assembly 16 is located in the plane of rotation of the rotor and generally parallel to its flexure member 14 to minimise the aerodynamic drag of the rotor.

Whilst two embodiments have been described and illustrated it will be understood that many modifications can be made without departing from the scope of the invention. For example, the tubular body portion could be aerodynamically shaped, e.g. oval in cross section, further to reduce aerodynamic drag. In the embodiment of FIGS. 2 and 3, the elastomer material 34 may have torsional deflection characteristics capable of providing for the relative rotational movement of the body portion 27, thereby eliminating the requirement for the spherical joint 30 and providing further simplicity of construction and assembly. Furthermore, the universal joint 18 and spherical joints 21 and 30 may comprise elastomeric bearings and flexible tailoring of the body portion 17 or 27 may be incorporated to allow for operational bending of the flexure members 14. The rotor of this invention can be used either as a helicopter main sustaining rotor or as a helicopter anti-torque rotor.

I claim:

1. A bearingless helicopter rotor including, for each of a plurality of rotor blades, a flexure member extending radially between a rotor hub and a blade attachment, said flexure members being flexible in torsion to permit blade pitch changes and in the flap and lead/lag planes to permit operational deflections, and an integral damper and pitch change assembly located externally of each flexure member in the plane of rotation of the rotor and comprising a generally tubular body portion closed at one end, torque transmitting means attaching said tubular body portion to the flexure member blade attachment, a rod protruding axially from the other end of the body portion and attached adjacent the rotor hub so that the assembly extends generally parallel to the associated flexure member, a pitch change arm rotationally fixed to the tubular body and adapted for connection to pitch change means to rotate the body about its longitudinal axis to change the pitch of the rotor blade, and damping means operative between the rod and the body portion to damp lead/lag movements of the rotor blade.

2. A rotor as claimed in claim 1, wherein said torque transmitting means comprises a torque transmitting universal joint.

3. A rotor as claimed in claim 1 wherein the rod is attached adjacent the hub by a spherical joint.

4. A rotor as claimed in claim 1, wherein said damping means comprise a piston carried by the rod and located in a chamber formed internally of the body portion and defined by axially spaced-apart bearing and seal assemblies, incompressible dmaping medium filling said chamber and a metering orifice interconnecting portions of the chamber on either side of the piston.

5. A rotor as claimed in claim 4, wherein the metering orifice comprises an annular gap between an external diameter of the piston and an internal diameter of the body portion.

6. A rotor as claimed in claim 1, wherein said damping means comprise an annular body of elastomer material bonded to the outside diameter of the rod and the inside diameter of the body portion.

* * * * *